(12) United States Patent
Ide et al.

(10) Patent No.: US 9,874,751 B2
(45) Date of Patent: Jan. 23, 2018

(54) OPTICAL ELEMENT, MANUFACTURING METHOD OF OPTICAL ELEMENT, OPTICAL DEVICE AND DISPLAY APPARATUS

(71) Applicant: Seiko Epson Corporation, Tokyo (JP)

(72) Inventors: Mitsutaka Ide, Shiojiri (JP); Masatoshi Yonekubo, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 38 days.

(21) Appl. No.: 14/930,588

(22) Filed: Nov. 2, 2015

(65) Prior Publication Data
US 2016/0124232 A1 May 5, 2016

(30) Foreign Application Priority Data

Nov. 5, 2014 (JP) ................................. 2014-224975

(51) Int. Cl.
*G03H 1/00* (2006.01)
*G02B 5/32* (2006.01)
(Continued)

(52) U.S. Cl.
CPC ..... *G02B 27/0172* (2013.01); *G02B 27/0081* (2013.01); *G02B 27/0905* (2013.01);
(Continued)

(58) Field of Classification Search
CPC .......... G03H 1/0005; G03H 1/00; G03H 1/02; G03H 1/04; G03H 1/08; G03H 2001/0027; G03H 2001/0033; G03H 2001/043; G03H 2240/25; G03H 2270/21; G03H 2001/0077; G03H 2001/0439; G03H 1/0408; G03H 2001/2226; G02B 2027/0181; G02B 2027/0183; G02B 27/0103; G02B 5/18; G02B 6/2848; G02B 27/0172; G02B 2027/0174; G02B 27/017; G02B 27/0081;
(Continued)

(56) References Cited

U.S. PATENT DOCUMENTS

| 7,764,413 B2 * | 7/2010 | Levola ............... G02B 27/0081 359/13 |
| 2007/0008624 A1 * | 1/2007 | Hirayama .......... G02B 27/0081 359/630 |

(Continued)

FOREIGN PATENT DOCUMENTS

| JP | 07-325267 A | 12/1995 |
| JP | 2006-301234 A | 11/2006 |
| JP | 2013-061594 A | 4/2013 |

*Primary Examiner* — Jade R Chwasz
(74) *Attorney, Agent, or Firm* — ALG Intellectual Property, LLC

(57) ABSTRACT

A light-transmissive layer and a partially reflective layer are mutually laminated in a luminous flux diameter enlargement element. When manufacturing the luminous flux diameter enlargement element, a light-transmissive first substrate, on which a first reflective layer is formed on a first surface, a light-transmissive second substrate, on which a first partially reflective layer is formed on a first surface, and which is formed so as to have equivalent thickness to the first substrate, and a third substrate, on which a second reflective layer is formed on a first surface, are laminated toward the same direction as a lamination direction of the respective first surfaces.

15 Claims, 7 Drawing Sheets

(51) Int. Cl.
  *G02B 27/01* (2006.01)
  *G02B 27/00* (2006.01)
  *G02B 27/09* (2006.01)
  *G02B 27/10* (2006.01)
  *G02B 27/14* (2006.01)
  *G02B 27/28* (2006.01)

(52) U.S. Cl.
  CPC ....... *G02B 27/1066* (2013.01); *G02B 27/142* (2013.01); *G02B 27/145* (2013.01); *G02B 27/283* (2013.01); *G02B 2027/0125* (2013.01)

(58) Field of Classification Search
  CPC .......... G02B 27/283; G02B 2027/0125; G02B 27/01; G02B 27/1066; G02B 27/0905; G02B 27/142
  USPC .............................. 359/13, 1, 12, 14, 15, 34
  See application file for complete search history.

(56) References Cited

U.S. PATENT DOCUMENTS

| | | | |
|---|---|---|---|
| 2013/0135747 A1* | 5/2013 | Yano | G02B 27/0101 359/630 |
| 2014/0043688 A1* | 2/2014 | Schrader | G02B 27/0172 359/630 |
| 2015/0277124 A1 | 10/2015 | Ide et al. | |
| 2015/0279114 A1 | 10/2015 | Yonekubo | |
| 2016/0124226 A1 | 5/2016 | Ide et al. | |

\* cited by examiner

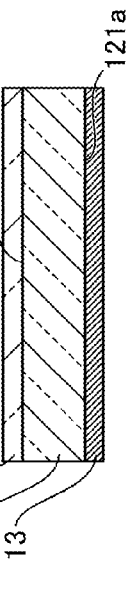
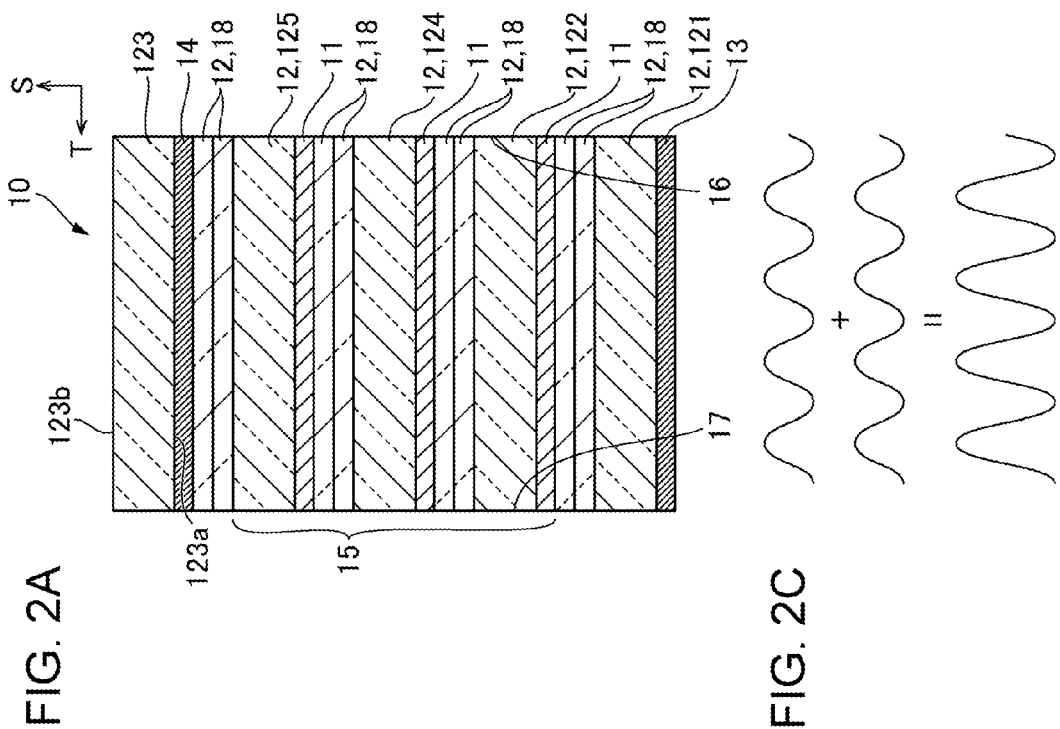

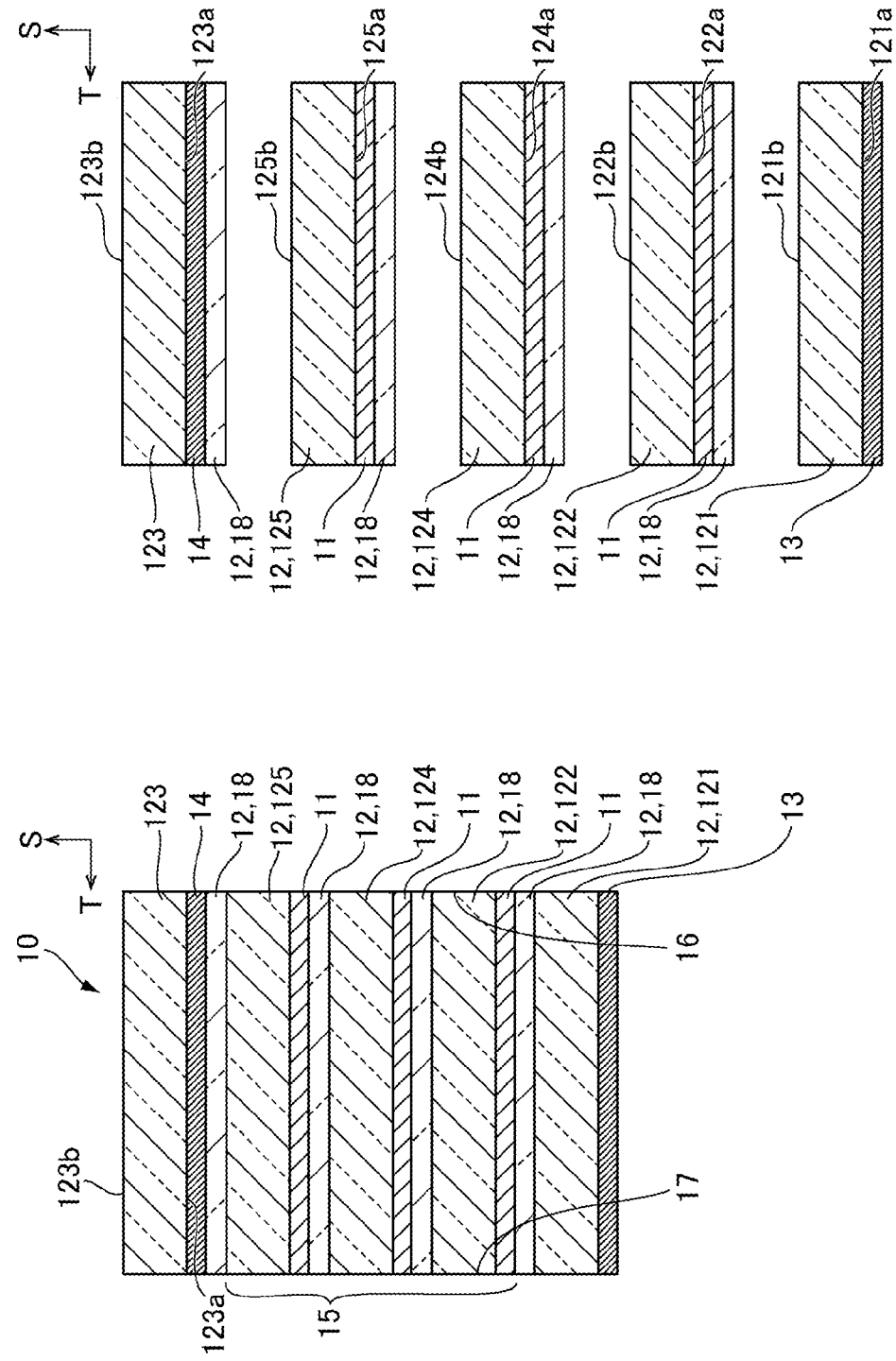

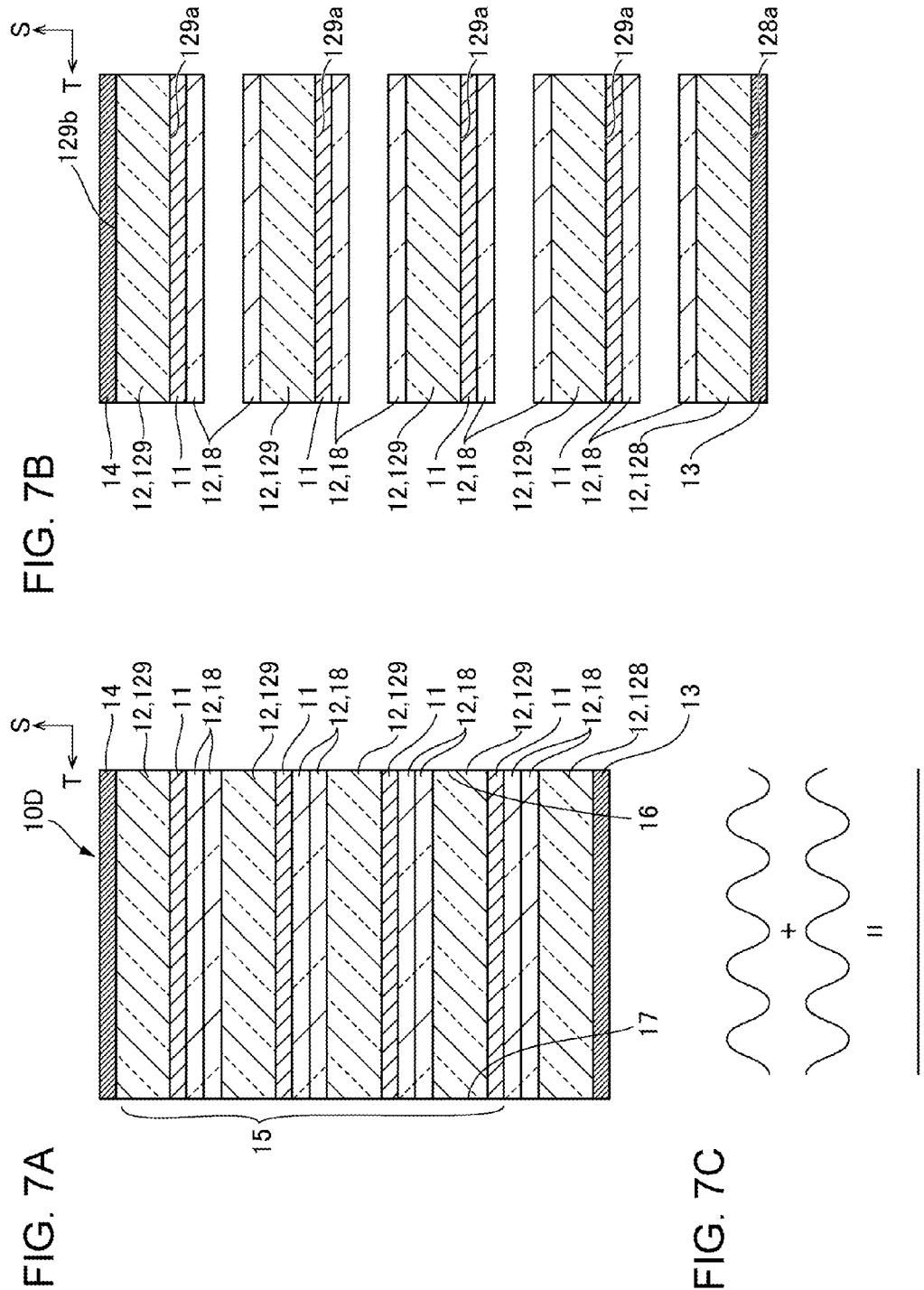

OPTICAL ELEMENT, MANUFACTURING METHOD OF OPTICAL ELEMENT, OPTICAL DEVICE AND DISPLAY APPARATUS

BACKGROUND

1. Technical Field

The present invention relates to optical element in which a partially reflective layer and a reflective layer are laminated with a substrate interposed therebetween, a manufacturing method of the optical element, an optical device and a display apparatus that uses the optical device.

2. Related Art

Optical elements such as luminous flux diameter enlargement elements have a structure in which a reflective layer is provided on both sides of a laminated body in which a light-transmissive layer and a partially reflective layer are alternately laminated, and the reflective layer is provided on both sides of the laminated body in a lamination direction. According to such elements, it is possible to enlarge the luminous flux diameter of incident light in a direction in which the light-transmissive layer and the partially reflective layer are laminated (refer to JP-A-2006-301234).

However, a specific configuration example is not disclosed in the configuration that is disclosed in JP-A-2006-301234, and if the configuration that is shown in FIGS. 7A and 7B is adopted, intervals between reflective layers (the partially reflective layer and the reflective layer) that are adjacent in the lamination direction differ from one another. More specifically, a luminous flux diameter enlargement element 10D that is shown in FIGS. 7A and 7B includes a laminated body 15 in which a light-transmissive layer 12 and a partially reflective layer 11 are alternately laminated, and includes a first reflective layer 13 and a second reflective layer 14 on both sides of the laminated body 15. In addition, the luminous flux diameter enlargement element 10D includes an incidence surface 16 and an emission surface 17 on both sides in a direction T that intersects a lamination direction S, and a luminous flux L10, which is incident to the incidence surface 16 from an oblique direction, proceeds in the direction T, which intersects the lamination direction S, while repeating total reflection by the first reflective layer 13, total reflection by the second reflective layer 14, transmission through the partially reflective layer 11, and reflection by the partially reflective layer 11, and is emitted from the emission surface 17 in a state in which the luminous flux diameter in the lamination direction S is enlarged. In order to manufacture such a luminous flux diameter enlargement element 10D, a light-transmissive substrate 128 (the light-transmissive layer 12), on which the first reflective layer 13 is formed on a first surface 128a, and a plurality of light-transmissive substrates 129 (the light-transmissive layer 12), on which the partially reflective layer 11 is formed on a first surface 129a, are respectively laminated toward the same direction as the lamination direction S of the respective first surfaces 128a and 129a using an adhesive layer 18. In addition, among the plurality of substrates 129, the second reflective layer 14 is formed on a second surface 129b of a substrate 129, which is positioned on a side that is opposite to the substrate 128 in the lamination direction S.

However, in the configuration that is shown in FIGS. 7A and 7B, the intervals between the first reflective layer 13 and the partially reflective layer 11, and the respective partially reflective layers 11 are equivalent, but the interval between the second reflective layer 14 and the partially reflective layer 11 differs from the intervals between the first reflective layer 13 and the partially reflective layer 11, and the respective partially reflective layers 11 as a result of the adhesive layer 18 not being present. Therefore, optical path lengths of pathways that are followed when incident light proceeds toward the emission surface 17 differ. As a result of this, as shown in FIG. 7C, there is a problem in that peaks and bottoms of phases deviate in each ray of light that follows each pathway and is emitted from the emission surface, a light intensity is weakened, and therefore, unevenness occurs in an optical intensity distribution of emitted light.

SUMMARY

An advantage of some aspects of the invention is to provide an optical element that can make the interval between a first reflective layer and a partially reflective layer and an interval between a second reflective layer and the partially reflective layer equivalent, a manufacturing method of the optical element, an optical device, and a display apparatus.

According to an aspect of the invention, there is provided an optical element including a first substrate that is light-transmissive substrate, the first substrate has a first reflective layer that is formed on a first surface of the first substrate, a second substrate that is light-transmissive substrate, the second substrate has a first partially reflective layer that is formed on a first surface of the second substrate, and the second substrate is formed so as to have the same thickness as the first substrate, and a third substrate has a second reflective layer that is formed on a first surface of the third substrate, in which the second substrate is disposed between the first substrate and the third substrate, and the first substrate, the second substrate and the third substrate are laminated so that the respective first surfaces thereof are parallel and are on the same side.

According to another aspect of the invention, there is provided a manufacturing method of an optical element including preparing a light-transmissive first substrate, on which a first reflective layer is formed on a first surface, a light-transmissive second substrate, on which a first partially reflective layer is formed on a first surface, and which is formed so as to have the same thickness as the first substrate, and a third substrate, on which a second reflective layer is formed on a first surface, disposing the second substrate between the first substrate and the third substrate, and laminating the first substrate, the second substrate and the third substrate so that the respective first surfaces thereof are parallel and are on the same side.

In the optical element according to the aspect of the invention, since the first reflective layer, the partially reflective layer and the second reflective layer are all formed on the first surface of each substrate (the first substrate, the second substrate and the third substrate), the interval between the first reflective layer and the partially reflective layer, which are adjacent in a lamination direction, and the interval between the second reflective layer and the partially reflective layer, which are adjacent in the lamination direction, are equivalent. Accordingly, the optical path lengths of pathways that are followed when incident light proceeds while repeating reflection by the first reflective layer, reflection by the second reflective layer, transmission through the partially reflective layer, and reflection by the partially reflective layer, are equivalent. Therefore, it is possible to align phases of light that proceed inside the optical element. For this reason, it is difficult for a circumstance in which rays of light of different phases weaken respective light intensities thereof, to occur.

In the optical element according to the aspect of the invention, the first substrate, the second substrate and the third substrate may be mutually adhered to one another using adhesive layers, which are formed so that the respective thicknesses thereof are equivalent. According the this configuration, even if the substrates are laminated using an adhesive layer, the interval between the first reflective layer and the partially reflective layer, which are adjacent in the lamination direction, and the interval between the second reflective layer and the partially reflective layer, which are adjacent in the lamination direction, are equivalent.

In the aspects of the invention, a fourth substrate that is light-transmissive substrate, the fourth substrate has a second partially reflective layer that is formed on a first surface of the fourth substrate, and the fourth substrate is formed so as to have the same thickness as the first substrate may be further included, and the fourth substrate may be disposed between the second substrate and the third substrate. According to this configuration, even in a case in which the number of partially reflective layers is increased, the interval between the first reflective layer and the partially reflective layer, which are adjacent in the lamination direction, the interval between the second reflective layer and the partially reflective layer, which are adjacent in the lamination direction, and the interval between the partially reflective layers, which are adjacent in the lamination direction, are equivalent.

In the optical element according to the aspect of the invention, the first partially reflective layer may be a dielectric multilayered film.

The optical element according to the aspect of the invention may further include an incidence surface on a first side in a direction that intersects a lamination direction of the first substrate, the second substrate and the third substrate, and an emission surface on a second side in the direction, and in the optical element, a luminous flux diameter of light that is incident from the incidence surface may be enlarged and emitted from the emission surface.

According to still another aspect of the invention, there is provided an optical device including a plurality of the optical elements to which the invention is applied, in which the respective plurality of optical elements are disposed so that the lamination directions of the first substrate, the second substrate and the third substrate mutually intersect one another. According to this configuration, light that is incident to an optical element after the luminous flux diameter thereof has been enlarged is incident to the next optical element, the luminous flux diameter thereof is enlarged, and is emitted. At this time, it is possible to enlarge the luminous flux diameter in a plurality of directions that mutually intersect one another.

According to still another aspect of the invention, there is provided a display apparatus including a light source section that emits a luminous flux, a scanning unit that performs scanning using the luminous flux that is emitted from the light source section and sets the luminous flux as an image, a deflection member that deflects light that is used in scanning by the scanning unit and causes the light to be incident to an eye of a user, and an optical device that enlarges diameter of a luminous flux that is disposed in an optical path that reaches the deflection member from the light source section, in which the optical device includes a first substrate that is light-transmissive substrate, the first substrate has a first reflective layer that is formed on a first surface of the first substrate, a second substrate that is light-transmissive substrate, the second substrate has a first partially reflective layer that is formed on a first surface of the second substrate, and the second substrate is formed so as to have the same thickness as the first substrate, and a third substrate has a second reflective layer that is formed on a first surface of the third substrate, the second substrate is disposed between the first substrate and the third substrate, and the first substrate, the second substrate and the third substrate are laminated so that the respective first surfaces thereof are parallel and are on the same side.

In the display apparatus according to the aspect of the invention, since the deflection member that deflects light that is used in scanning by the scanning unit is included, it is possible to use the display apparatus as a retina scanning type of projection type display apparatus. Even in this case, since the luminous flux diameter is enlarged by the optical device in two directions that mutually intersect one another and the luminous flux is caused to be incident to an eye of a user, it is even possible to cause the luminous flux to be incident from a pupil of an eye if the position of the eye is shifted. In addition, in the optical device, since the first reflective layer, the partially reflective layer and the second reflective layer are all formed on the first surface of each substrate (the first substrate, the second substrate and the third substrate), the interval between the first reflective layer and the partially reflective layer, which are adjacent in a lamination direction, and the interval between the second reflective layer and the partially reflective layer, which are adjacent in the lamination direction, are equivalent. Accordingly, the optical path lengths of pathways that are followed when incident light proceeds while repeating reflection by the first reflective layer, reflection by the second reflective layer, transmission through the partially reflective layer, and reflection by the partially reflective layer, are equivalent. Therefore, it is possible to align phases of light that proceed inside the optical elements. For this reason, it is difficult for a circumstance in which rays of light of different phases weaken respective light intensities thereof, to occur.

In the display apparatus according to the aspect of the invention, it is preferable that the optical device is disposed in the optical path that reaches the deflection member from the scanning unit. According to this configuration, since a small amount of light of the luminous flux is incident to the scanning unit, it is possible to perform miniaturization of a deflection surface of the scanning unit.

In the display apparatus according to the aspect of the invention, it is preferable that the deflection member is provided with a reflective surface that is formed from a concave curved surface. According to this configuration, it is possible to reliably reflect light toward an eye of a user with a simple configuration.

In the display apparatus according to the aspect of the invention, it is preferable that the deflection member is a partially transmissive reflective combiner. According to this configuration, it is possible to configure a see-through type of head mounted display (eye glass display), and therefore, it is possible to simultaneously view external light, which is transmitted through the combiner, and image light, which is incident from a pupil of an eye of a user.

In the display apparatus according to the aspect of the invention, the deflection member may be a hologram that deflects incident light using diffraction.

BRIEF DESCRIPTION OF THE DRAWINGS

The invention will be described with reference to the accompanying drawings, wherein like numbers reference like elements.

FIGS. 2A to 2C are explanatory diagrams that show an aspect of a specific configuration example of a luminous flux diameter enlargement element according to Embodiment 1 of the invention.

FIGS. 3A and 3B are explanatory diagrams that show an aspect of a specific configuration example of a luminous flux diameter enlargement element according to Embodiment 2 of the invention.

FIGS. 7A to 7C are explanatory diagrams that show an aspect of a luminous flux diameter enlargement element according to a reference example of the invention.

DESCRIPTION OF EXEMPLARY EMBODIMENTS

Figure 1A:
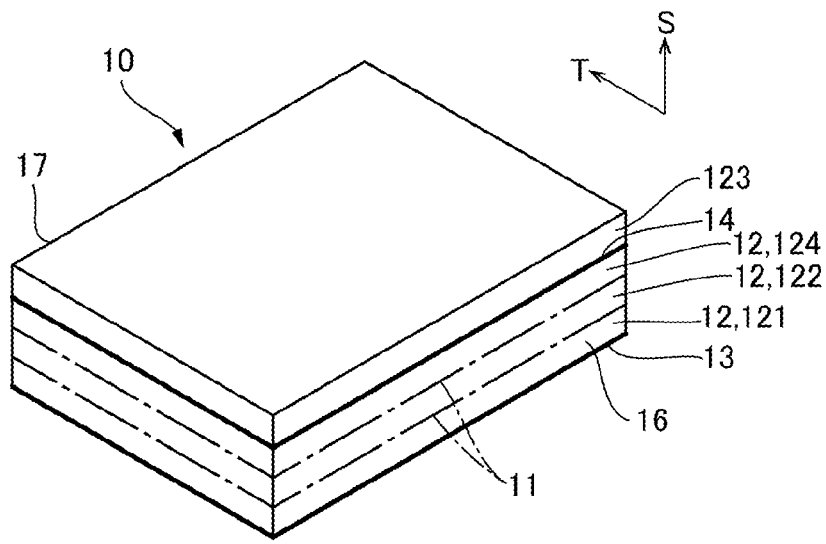
FIGS. 1A and 1B are explanatory diagrams that show an aspect of a luminous flux diameter enlargement element according to Embodiment 1 of the invention.

Hereinafter, embodiments of the invention will be described. Additionally, the following description will be given focusing on a case in which an optical element according to the aspect of the invention is used as a luminous flux diameter enlargement element. In addition, in the figures that are referred to in the following description, the numbers and scales of each layer and each member are altered in order to make each layer and each member have a size that is easy to understand in the drawings. For example, the number of layers of a partially reflective layer is set as two layers in FIGS. 1A and 1B, and FIGS. 5A to 5C, the number of layers of the partially reflective layer is set as three layers in FIGS. 2A to 2C, and FIGS. 3A and 3B, and the number of layers of the partially reflective layer is set as four layers in FIG. 4. In addition, since the basic configuration of a luminous flux diameter enlargement element according to the aspect of the invention is the same as that of the luminous flux diameter enlargement element that is described with reference to FIGS. 7A to 7C, description will be performed with the same symbols applied to common portions.

Embodiment 1

Figure 1B:
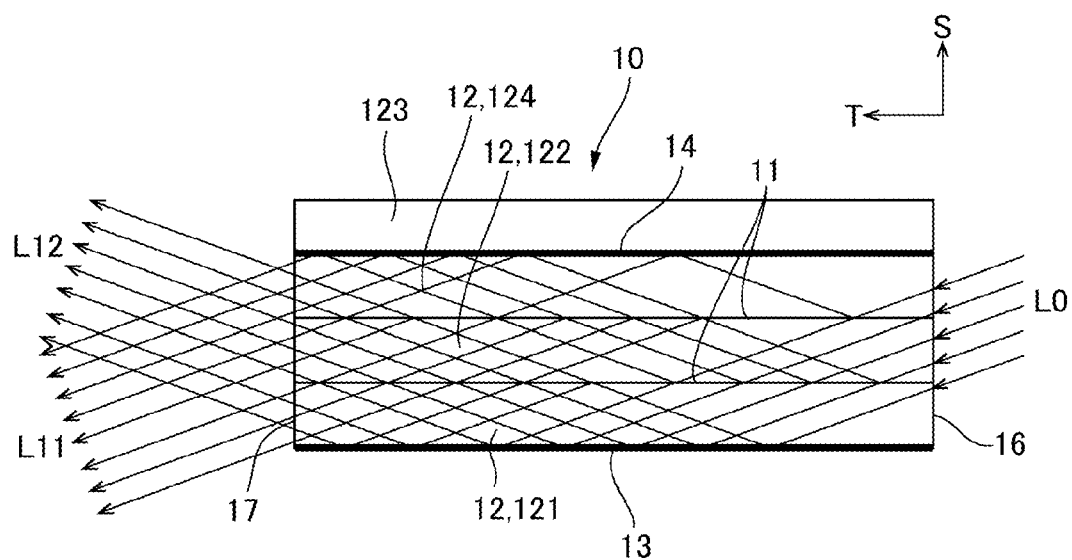

FIGS. 1A and 1B are explanatory diagrams that show an aspect of a luminous flux diameter enlargement element according to Embodiment 1 of the invention, and FIGS. 1A and 1B are respectively a perspective view and a cross-sectional view of the optical device 1.

As shown in FIGS. 1A and 1B, in a luminous flux diameter enlargement element 10 of the embodiment, a light-transmissive layer 12 and a partially reflective layer 11 are alternately laminated. In addition, the luminous flux diameter enlargement element 10 includes a first reflective layer 13 on a first side of a lamination direction S, and includes a second reflective layer 14 on a second side in the lamination direction. In the luminous flux diameter enlargement element 10, the first reflective layer 13, the second reflective layer 14 and the partially reflective layer 11 are parallel, and the thicknesses of a plurality of light-transmissive layers 12 are equivalent. Accordingly, an interval between the first reflective layer 13 and the partially reflective layer 11, which are adjacent in the lamination direction S, an interval between the second reflective layer 14 and the partially reflective layer 11, which are adjacent in the lamination direction S, and the intervals between partially reflective layers 11, which are adjacent in the lamination direction S, are all equivalent. In addition, in the luminous flux diameter enlargement element 10, the thicknesses of a plurality of partially reflective layers 11 are equivalent.

In the present embodiment, the light-transmissive layer 12 is configured by a substrate such as a glass substrate or a quartz substrate, and a light-transmissive adhesive layer 18, which will be described later, and the first reflective layer 13 and the second reflective layer 14 are formed from vapor deposited films of light-transmissive metal films such as aluminum.

The partially reflective layer 11 is formed from a dielectric multilayered film in which, among inorganic films such as $SiO_2$ (silicon dioxide), $TiO_2$ (titanium dioxide), $Al_2O_3$ (alumina), $CaF_2$ (calcium fluoride), $MgF_2$ (magnesium fluoride), ZnS (zinc sulfide), $ZrO_2$ (zirconium dioxide), a dielectric film with a low dielectric constant and a dielectric film with a high dielectric constant are alternately laminated. In the present embodiment, the partially reflective layer 11 and the partially reflective layer 11 are formed from dielectric multilayered films in which $SiO_2$ and $TiO_2$ are alternately laminated using a vapor deposition method.

The luminous flux diameter enlargement element 10 is provided with an incidence surface 16 on a first side end portion in a direction T that intersects the lamination direction S, and is provided with an emission surface 17 on a second side end portion. In the present embodiment, the luminous flux diameter enlargement element 10 has a rectangular parallelopiped shape. Therefore, in the luminous flux diameter enlargement element 10, the incidence surface 16 is formed from an end surface toward a first side in the direction T, and the emission surface 17 is formed from an end surface toward a second side in the direction T.

In a luminous flux diameter enlargement element 10 that is configured in this manner, if a luminous flux L10 is incident to the incidence surface 16 from a direction that is inclined with respect to the lamination direction S in a parallel luminous flux state, the luminous flux L10 proceeds in the direction T while repeating total reflection by the first reflective layer 13, total reflection by the second reflective layer 14, transmission through the partially reflective layer 11, and reflection by the partially reflective layer 11, and is emitted as a parallel luminous flux in the direction that is inclined with respect to the lamination direction S from the emission surface 17 in a state in which the luminous flux diameter in the lamination direction S is enlarged. At this time, luminous fluxes L11 and L12, which were split into two luminous fluxes in the lamination direction S, are emitted from the emission surface 17, but the luminous flux diameters of both the luminous fluxes L11 and L12 are enlarged in the lamination direction S in comparison with the luminous flux L0.

Specific Configuration Example of Luminous Flux Diameter Enlargement Element 10

FIGS. 2A to 2C are explanatory diagrams that show an aspect of a specific configuration example of a luminous flux diameter enlargement element 10 according to Embodiment 1 of the invention, and FIGS. 2A to 2C are respectively a cross-sectional view that shows a specific configuration example of the luminous flux diameter enlargement element 10, a cross-sectional view that shows a manufacturing method of the luminous flux diameter enlargement element 10, and an explanatory diagram that shows advantages of a case in which the present example is adopted.

As shown in FIGS. 2A and 2B, in the luminous flux diameter enlargement element 10 of the present embodiment, a plurality of light-transmissive layers 12 are respectively configured by light-transmissive substrates (a first substrate 121, a second substrate 122, a fourth substrate 124, and a fifth substrate 125) with equivalent thicknesses, and light-transmissive adhesive layers 18, which will be described later. The luminous flux diameter enlargement element 10 includes a laminated body 15 in which a plurality of light-transmissive substrates (the second substrate 122, the fourth substrate 124, and the fifth substrate 125), on which the partially reflective layer 11 is formed on first surfaces 122a, 124a and 125a in the lamination direction S, are bonded together by the light-transmissive adhesive layers 18 with the first surfaces 122a, 124a and 125a facing the same direction.

In this instance, the partially reflective layer 11 that is formed on the first surface 122a of the second substrate 122 is a "first partially reflective layer" in the aspect of the invention, the partially reflective layer 11 that is formed on the first surface 124a of the fourth substrate 124 is a "second partially reflective layer" in the aspect of the invention, and the partially reflective layer 11 that is formed on the first surface 125a of the fifth substrate 125 is a "third partially reflective layer" in the aspect of the invention.

In addition, the light-transmissive first substrate 121, on which the first reflective layer 13 is formed on a first surface 121a in the lamination direction S, is bonded together on a first side in the lamination direction S of the laminated body 15 using the adhesive layer 18, and a third substrate 123, on which the second reflective layer 14 is formed on a first surface 123a in the lamination direction S, is bonded together on a second side in the lamination direction S of the laminated body 15. Accordingly, the first substrate 121, the second substrate 122, the third substrate 123, the fourth substrate 124 and the fifth substrate 125 are disposed such that the first surfaces 121a, 122a, 123a, 124a, and 125a face the same direction. In addition, the second substrate 122 is disposed between the first substrate 121 and the third substrate 123, and the fourth substrate 124 is disposed between the second substrate 122 and the third substrate 123. In addition, the fifth substrate 125 is disposed between the fourth substrate 124 and the third substrate 123. In the present embodiment, the third substrate 123 is also formed from a light-transmissive substrate. In this instance, the first surfaces 121a, 122a, 123a, 124a, and 125a are parallel to one another. In addition, the first substrate 121, the second substrate 122, the third substrate 123, the fourth substrate 124 and the fifth substrate 125 are formed from a glass substrate or a quartz substrate, and the refractive indexes and thicknesses thereof are equivalent. In addition, all of the plurality of adhesive layers 18 are adhesives such as silicon-based adhesives, and the refractive indexes thereof after curing are equivalent to the refractive indexes of the light-transmissive layers 12 (the first substrate 121, the second substrate 122, and the third substrate 123). In addition, the thickness of one layer of all of the plurality of adhesive layers 18 is equivalent. Accordingly, an interval between the first reflective layer 13 and the partially reflective layer 11, which are adjacent in the lamination direction S, an interval between the second reflective layer 14 and the partially reflective layer 11, which are adjacent in the lamination direction S, and the intervals between partially reflective layers 11, which are adjacent in the lamination direction S, are equivalent.

In a manufacturing method of this kind of luminous flux diameter enlargement element 10, the first surfaces 121a, 122a, 123a, 124a, and 125a of the first substrate 121, the second substrate 122, the third substrate 123, the fourth substrate 124 and the fifth substrate 125, which will be described later, are bonded together toward the same direction using the adhesive layers 18. Firstly, the first reflective layer 13 is formed on the first surface 121a in the lamination direction S of a first first substrate 121, and the adhesive layer 18 is formed on a second surface 121b. Next, the partially reflective layers 11 and the adhesive layers 18 are formed in order on the first surfaces 122a, 124a and 125a in the lamination direction S of a second, third and fourth second substrate 122, fourth substrate 124 and fifth substrate 125, and the adhesive layers 18 are formed on second surfaces 122b, 124b and 125b. Subsequently, the second reflective layer 14 and the adhesive layer 18 are formed in order on the first surface 123a in the lamination direction S of a fifth third substrate 123, and the adhesive layer 18 or the like is not formed on the second surface 123b. Accordingly, if the five substrates (the first substrate 121, the second substrate 122, the third substrate 123, the fourth substrate 124 and the fifth substrate 125) are bonded together using the adhesive layers 18 in a state in which the respective first surfaces 121a, 122a, 123a, 124a, and 125a face the same direction in the lamination direction S, a light-transmissive substrate and two layers of the adhesive layer 18 are present between the first reflective layer 13 and the partially reflective layer 11, which are adjacent in the lamination direction S, between the second reflective layer 14 and the partially reflective layer 11, which are adjacent in the lamination direction S, and between partially reflective layers 11, which are adjacent in the lamination direction.

Additionally, in the present example, description was given with the number of lamination layers set as five, but, for example, in a practical sense, approximately 10 substrates are laminated.

Main Effects of Present Embodiment

In the luminous flux diameter enlargement element 10 that is configured in this manner, an interval between the first reflective layer 13 and the partially reflective layer 11, which are adjacent in the lamination direction S, an interval between the second reflective layer 14 and the partially reflective layer 11, which are adjacent in the lamination direction S, and the intervals between partially reflective layers 11, which are adjacent in the lamination direction, are all equivalent. Therefore, the optical path length of light that is emitted from the emission surface 17 by following any optical path is equivalent when the luminous flux L10 proceeds in the direction T, which intersects the lamination direction S, while repeating total reflection by the first reflective layer 13, total reflection by the second reflective layer 14, transmission through the partially reflective layer 11, and reflection by the partially reflective layer 11 inside the luminous flux diameter enlargement element 10, and is emitted from the emission surface 17. Accordingly, as shown in FIG. 2C, since peaks and bottoms of phases are aligned in each ray of light that follows each pathway and is emitted from the emission surface 17, the optical intensity is strengthened. For this reason, optical intensity distribution is substantially constant in light that is emitted from the emission surface 17 following each pathway.

In addition, since the configuration of the first substrate 121 and the third substrate 123 is the same, it is possible to use a substrate that is manufactured using the same process. For this reason, it is possible to reduce the cost of the luminous flux diameter enlargement element 10.

Embodiment 2

FIGS. 3A and 3B are explanatory diagrams that show an aspect of a specific configuration example of the luminous flux diameter enlargement element 10 according to Embodiment 2 of the invention, and FIGS. 3A and 3B are respectively a cross-sectional view that shows a specific configuration example of the luminous flux diameter enlargement element 10, and a cross-sectional view that shows a manufacturing method of the luminous flux diameter enlargement element 10.

In the state that is shown in FIGS. 2A to 2C, the adhesive layers 18 are provided on both surfaces of the second substrate 122, the fourth substrate 124 and the fifth substrate 125, but the adhesive layers 18 may be provided on the first surfaces 122a, 124a, and 125a of the second substrate 122, the fourth substrate 124 and the fifth substrate 125 only in the manner of the present example. More specifically, as shown in FIGS. 3A and 3B, the first reflective layer 13 is formed on the first surface 121a in the lamination direction S of a first first substrate 121, and the adhesive layer 18 or the like is not formed on the second surface 121b. Next, the partially reflective layers 11 and the adhesive layers 18 are formed in order on the first surfaces 122a, 124a and 125a in the lamination direction S of a second, third and fourth second substrate 122, fourth substrate 124 and fifth substrate 125, and the adhesive layers 18 or the like is not formed on the second surfaces 122b, 124b and 125b. Subsequently, the second reflective layer 14 and the adhesive layer 18 are formed in order on the first surface 123a in the lamination direction S of a fifth third substrate 123, and the adhesive layer 18 or the like is not formed on the second surface 123b. Accordingly, if the five substrates (the first substrate 121, the second substrate 122, the third substrate 123, the fourth substrate 124 and the fifth substrate 125) are bonded together using the adhesive layers 18 in a state in which the respective first surfaces 121a, 122a, 123a, 124a, and 125a face the same direction in the lamination direction S, a light-transmissive substrate and one layer of the adhesive layer 18 is present between the first reflective layer 13 and the partially reflective layer 11, which are adjacent in the lamination direction S, between the second reflective layer 14 and the partially reflective layer 11, which are adjacent in the lamination direction S, and between partially reflective layers 11, which are adjacent in the lamination direction. For this reason, an interval between the first reflective layer 13 and the partially reflective layer 11, which are adjacent in the lamination direction S, an interval between the second reflective layer 14 and the partially reflective layer 11, which are adjacent in the lamination direction S, and the intervals between partially reflective layers 11, which are adjacent in the lamination direction, are all equivalent.

Embodiment 3

Figure 4:
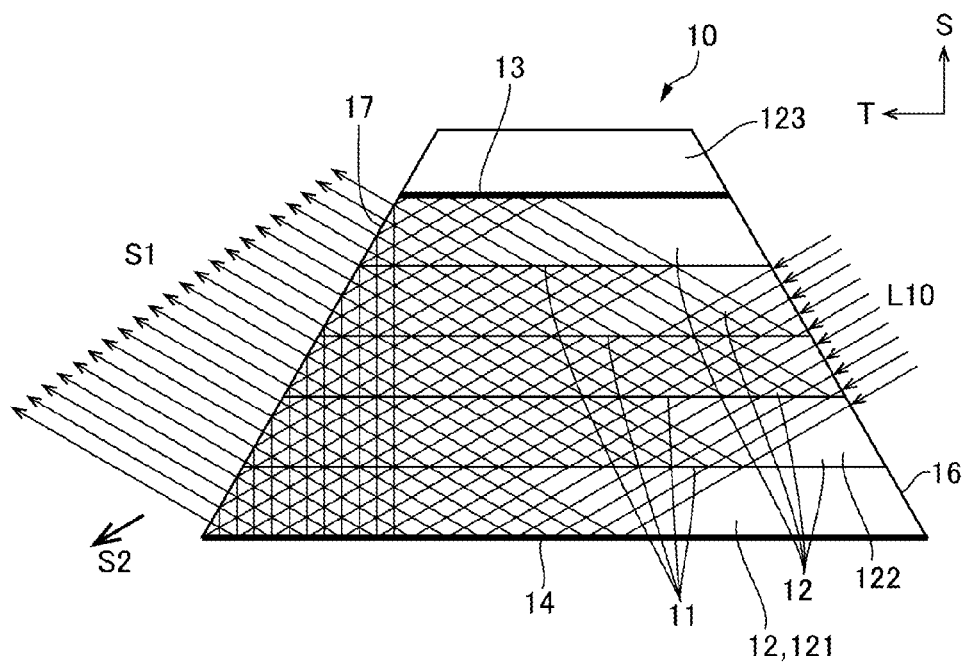
FIG. 4 is an explanatory diagram that shows an aspect of a luminous flux diameter enlargement element according to Embodiment 3 of the invention.

FIG. 4 is an explanatory diagram that shows an aspect of a luminous flux diameter enlargement element 10 according to Embodiment 3 of the invention. In Embodiments 1 and 2, the luminous flux diameter enlargement element 10 has a rectangular parallelopiped shape, but in the present embodiment, as shown in FIG. 4, the luminous flux diameter enlargement element 10 has a cross-sectional trapezoidal shape in which two sides, which are opposite to one another in the lamination direction S, are parallel, and the incidence surface 16 and the emission surface 17 are inclined at the same angle in a direction that is opposite to the lamination direction S. The light-transmissive layer 12 and the partially reflective layer 11 are also alternately laminated in this kind of configuration. In addition, the first reflective layer 13, the partially reflective layer 11 and the second reflective layer 14 are parallel.

In the luminous flux diameter enlargement element 10 of such a configuration, it is also possible to enlarge the luminous flux diameter in the lamination direction S of the luminous flux L10 that is incident from the incidence surface 16 and emit the luminous flux L10 from the emission surface 17. In addition, since the optical path lengths of rays of light that are emitted following all optical paths are equivalent, optical intensity distribution is substantially constant in light that is emitted from the emission surface 17 following each pathway. In addition, in the luminous flux diameter enlargement element 10 of the present embodiment, light that is incident to the emission surface 17 at a shallow angle is reflected by the emission surface 17. Therefore, among light that is emitted from the emission surface 17 split into an S1 direction and an S2 direction, an amount of light in the S1 direction that is used in the display of images or the like is greater than an amount of light toward the S2 direction. For this reason, since the amount of light in the S2 direction that is not used in the display of images or the like, is small, it is possible to reduce loss in the amount of light.

Configuration of Optical Device

In the following description, a "first direction" in the aspect of the invention is set as a Z direction, a "second direction", which intersects the first direction, is set as a Y direction, and a "third direction", which intersects the first direction and the second direction, is set as an X direction. In addition, in the following description, a case in which a first direction Z, a second direction Y, and a third direction X are mutually orthogonal to one another will be illustrated as an example.

Figure 5A:
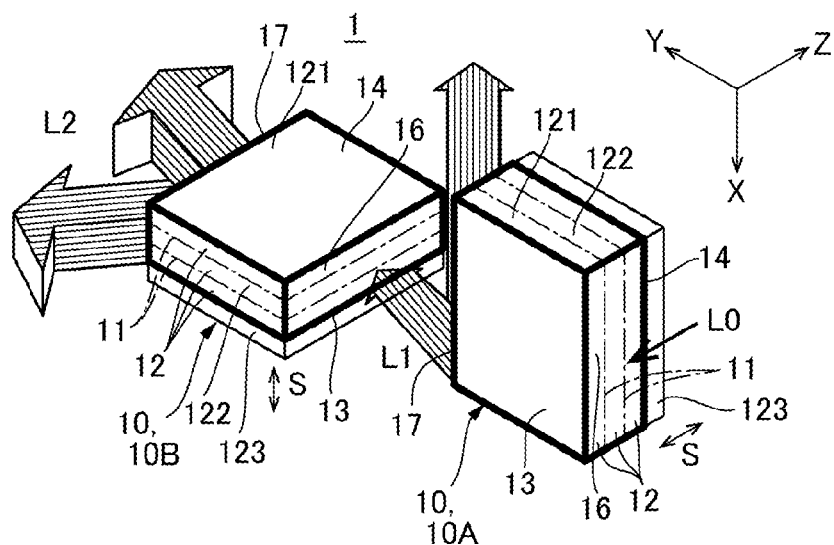
FIGS. 5A to 5C are explanatory diagrams that show an aspect of an optical device in which a luminous flux diameter enlargement element to which the invention is applied, is used.
Figure 5B:
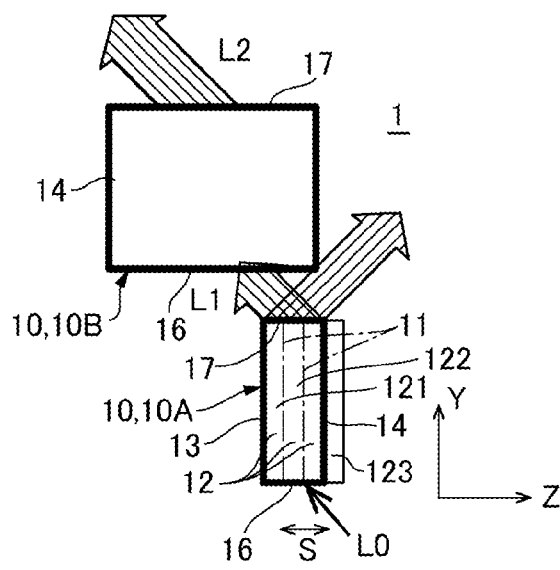
Figure 5C:
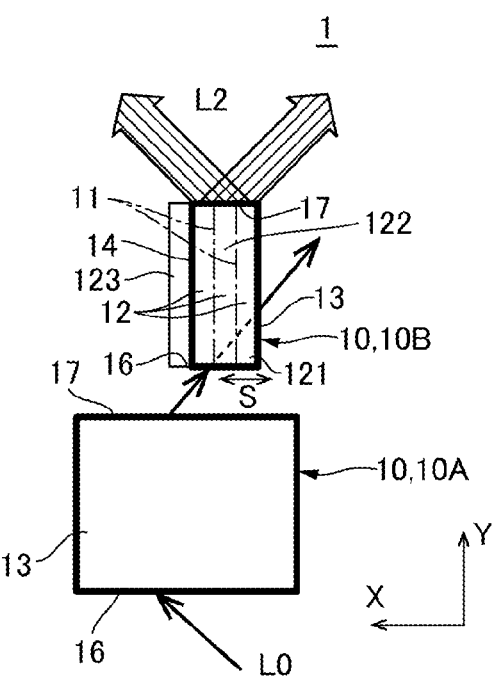

FIGS. 5A to 5C are explanatory diagrams that show an aspect of an optical device 1 in which a luminous flux diameter enlargement element to which the invention is applied, is used, and FIGS. 5A to 5C are respectively a perspective view of the optical device 1, an explanatory diagram in which the optical device 1 is viewed from the X direction, and an explanatory diagram in which the optical device 1 is viewed from the Z direction.

As shown in FIGS. 5A to 5C, the optical device 1 of the present embodiment includes a first luminous flux diameter enlargement element 10A in which the light-transmissive layer 12 and the partially reflective layer 11 are alternately laminated in the first direction Z, and a second luminous flux diameter enlargement element 10B in which the light-transmissive layer 12 and the partially reflective layer 11 are alternately laminated in the third direction X. In this instance, the first luminous flux diameter enlargement element 10A and the second luminous flux diameter enlargement element 10B are formed from the luminous flux diameter enlargement element 10 that was described with reference to FIGS. 1A to 4. In the first luminous flux diameter enlargement element 10A, the lamination direction S of the light-transmissive layer 12 and the partially reflective layer 11 is the first direction Z. Accordingly, the first reflective layer 13 and the second reflective layer 14 are included on both sides in the first direction Z, and the third substrate 123 is included on a side of the second reflective layer 14 that is opposite to the first reflective layer 13. In addition, in the second luminous flux diameter enlargement element 10B, the lamination direction S of the light-transmissive layer 12 and the partially reflective layer 11 is the third direction X. Accordingly, the first reflective layer 13 and the second reflective layer 14 are included on both sides in the third direction X, and the third substrate 123 is included on a side of the second reflective layer 14 that is opposite to the first reflective layer 13. In addition, the first luminous flux diameter enlargement element 10A is provided with an incidence surface 16 on a first side end portion in the second direction Y, and an emission surface 17 on a second side end portion in the second direction Y. The second luminous flux diameter enlargement element 10B is provided with an incidence surface 16 on a first side end portion in the second direction Y, and an emission surface 17 on a second side end portion in the second direction Y. In this instance, the emission surface 17 of the first luminous flux diameter enlargement element 10A and the incidence surface 16 of the second luminous flux diameter enlargement element 10B face one another in a state of being separated in the second direction Y. The first luminous flux diameter enlargement element 10A and the second luminous flux diameter enlargement element 10B are disposed so that the emission surface 17 faces an end portion of the incidence surface 16 in the first direction Z, and the incidence surface 16 faces a substantial center of the emission surface 17 in the third direction X.

In an optical device 1 that is configured in this manner, in the first luminous flux diameter enlargement element 10A, if a luminous flux L0 is incident to the incidence surface 16 from a direction that is inclined in the first direction Z in a parallel luminous flux state, the luminous flux L0 proceeds in the second direction Y while repeating total reflection by the first reflective layer 13, total reflection by the second reflective layer 14, transmission through the partially reflective layer 11, and reflection by the partially reflective layer 11, and is emitted as a parallel luminous flux from the emission surface 17 in a state in which the luminous flux diameter thereof in the first direction Z is enlarged. At this time, a luminous flux L1 that is emitted from the emission surface 17 is emitted in a state of being split into two in the first direction Z. Additionally, the luminous flux L0 that is incident to the first luminous flux diameter enlargement element 10A is inclined by approximately 45° with respect to the second direction Y and the third direction X.

In this instance, the emission surface 17 of the first luminous flux diameter enlargement element 10A and the incidence surface 16 of the second luminous flux diameter enlargement element 10B are separated. Therefore, a portion of the luminous flux L1 that is split into two and emitted from the emission surface 17 of the first luminous flux diameter enlargement element 10A is incident to the incidence surface 16 of the second luminous flux diameter enlargement element 10B. Accordingly, the luminous flux L1 that is incident to the second luminous flux diameter enlargement element 10B is inclined with respect to the first direction Z and the third direction X, and is inclined by approximately 45° with respect to the second direction Y.

Next, in the second luminous flux diameter enlargement element 10B, if the luminous flux L1 is incident to the incidence surface 16 from a direction that is inclined in the third direction X in a parallel luminous flux state, the luminous flux L1 proceeds in the second direction Y while repeating total reflection by the first reflective layer 13, total reflection by the second reflective layer 14, transmission through the partially reflective layer 11, and reflection by the partially reflective layer 11, and is emitted as a parallel luminous flux from the emission surface 17 in a state in which the luminous flux diameter thereof in the third direction X is enlarged. At this time, a luminous flux L2 that is emitted from the emission surface 17 is emitted in a state of being split into two in the third direction X. Additionally, the luminous flux L1 that is incident to the second luminous flux diameter enlargement element 10B is inclined with respect to the first direction Z and the third direction X, and is inclined by approximately 45° with respect to the second direction Y.

In this instance, since the emission surface 17 of the first luminous flux diameter enlargement element 10A and the incidence surface 16 of the second luminous flux diameter enlargement element 10B are separated, a portion of light that is split into two in the first direction Z and emitted from the emission surface 17 is incident to the incidence surface 16. Therefore, surplus light is not incident to the incidence surface 16. In addition, since the emission surface 17 of the first luminous flux diameter enlargement element 10A and the incidence surface 16 of the second luminous flux diameter enlargement element 10B are separated, it is possible to provide a reflective surface, which reflects surplus light of the light that is emitted from the emission surface 17 toward the emission surface 17, on the emission surface 17 of the first luminous flux diameter enlargement element 10A, and therefore, according to such a configuration, it is possible to return surplus light to the first luminous flux diameter enlargement element 10A. For this reason, it is possible to prevent a circumstance in which surplus light is emitted toward a second luminous flux diameter enlargement element 10B side. Usage Example of Optical Device in Display Apparatus FIGS. 6A and 6B are explanatory diagrams that show an aspect of a display apparatus 50 in which an optical device 1 to which the invention is applied, is used, and FIGS. 6A and 6B are respectively an explanatory diagram of an optical system and explanatory diagram that shows an external appearance and the like of the display apparatus 50.

Figure 6A:
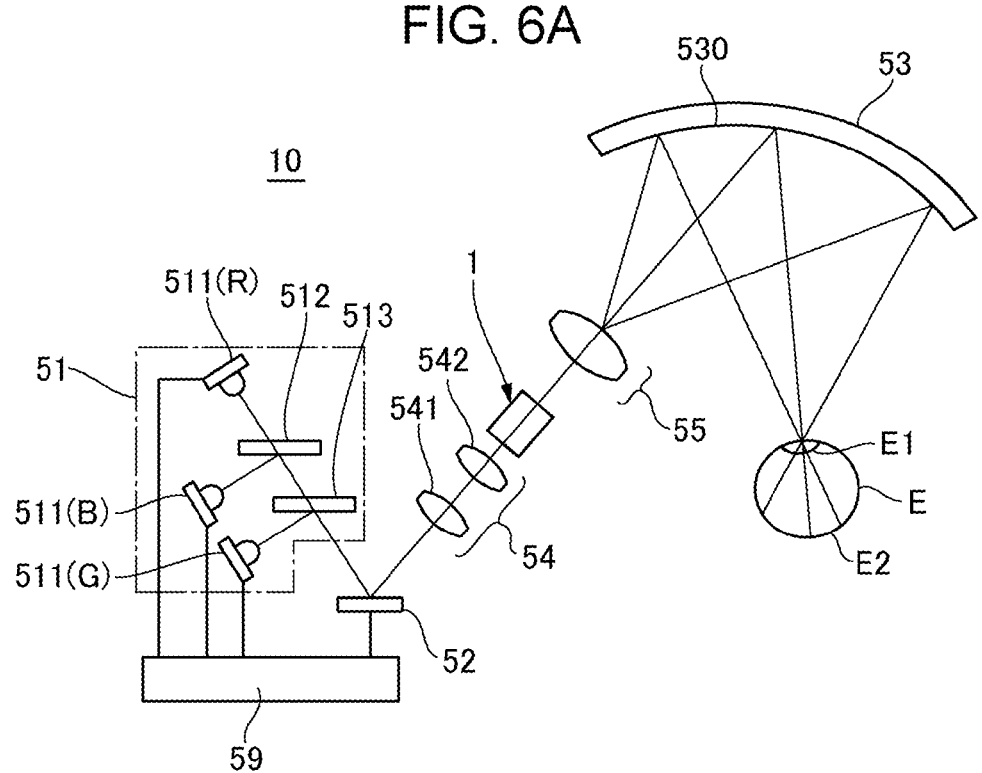
FIGS. 6A and 6B are explanatory diagrams that show an aspect of a display apparatus in which an optical device to which the invention is applied, is used.
Figure 6B:
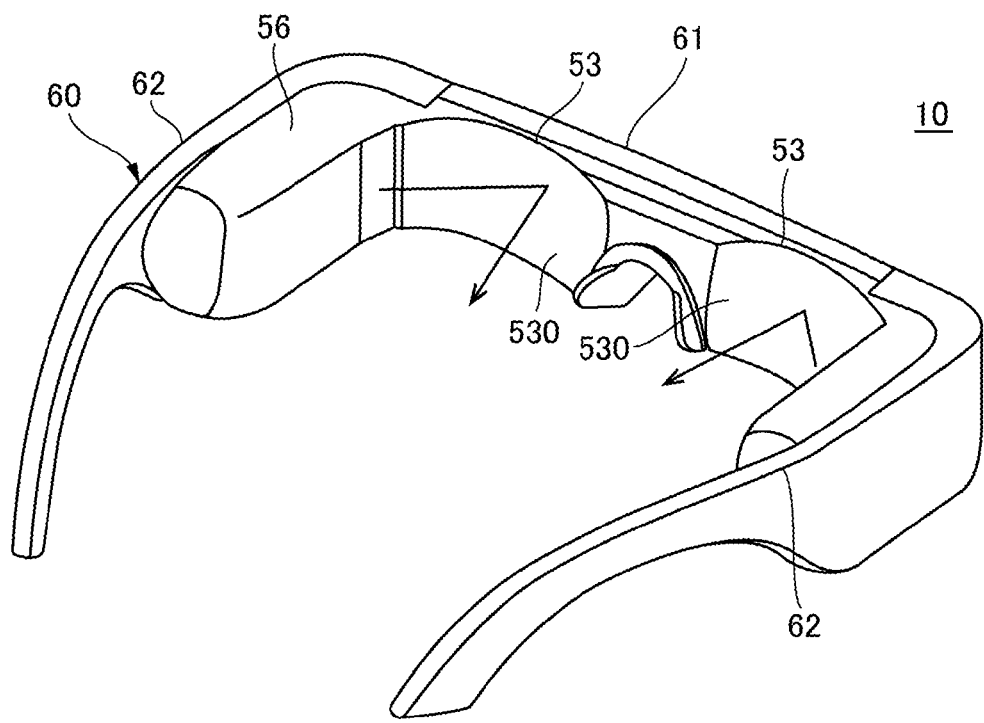

In FIG. 6A, the display apparatus 50 includes a light source section 51 that emits light for displaying images, a scanning unit 52 that performs scanning using the light that is emitted from the light source section 51, and a deflection member 53 that deflects light that is used in scanning by the scanning unit 52 and causes the light to be incident to an eye E of a user. In addition, the display apparatus 50 of the present embodiment includes a relay lens system 54, and a projection lens system 55 on an emission side from the scanning unit 52. The relay lens system 54 is, for example, configured by two lenses 541 and 542.

The light source section 51 emits light source light prior to optical modulation or modulated light that has been optically modulated. In the present embodiment, the light source section 51 includes a red laser element 511 (R) that emits red light, a green laser element 511 (G) that emits green light and a blue laser element 511 (B) that emits blue light, and includes two half mirrors 512 and 513 that synthesize the optical paths of these laser elements. In this instance, the red laser element 511 (R), the green laser element 511 (G) and the blue laser element 511 (B) emit luminous fluxes in which the optical intensity that corresponds to each dot of an image to be displayed has been modulated under the control of a control unit 59.

The scanning unit 52 performs scanning using incidence light in two directions that correspond to a horizontal direction and a vertical direction of an image, and light that is used in scanning is projected onto the deflection member 53 via the relay lens system 54 and the projection lens system 55. The scanning unit 52 can be realized using a micromirror device that is formed by Micro Electro Mechanical Systems (MEMS) technology using a silicon substrate or the like. At this time, the scanning unit 52 can adopt a configuration that performs scanning using incidence light in two directions that correspond to a horizontal direction and a vertical direction of an image using a single scanning mechanism. In addition, the scanning unit 52 may be configured by a first scanning mechanism that performs scanning using incidence light in a first direction of two directions that correspond to a horizontal direction and a vertical direction, and a second scanning mechanism that performs scanning using incidence light in a second direction of the two directions. Such a scanning unit 52 also performs scanning using incidence light in predetermined directions under the control of the control unit 59.

In the present embodiment, the display apparatus 50 is configured by as a retina scanning type of projection type display apparatus. In this instance, the deflection member 53 is a reflection member that is provided with a reflective surface 530 that has a concave curved surface shape, reflects projected light and causes the light to be incident to an eye E of a user. In such a display apparatus 50 (a retina scanning type of projection type display apparatus), images are made to be recognizable by a user as a result of modulated light, which is used in scanning in two directions by the scanning unit 52, being reflected by the reflective surface 530 of the deflection member 53 and arriving at a retina E2 via a pupil E1.

In the present embodiment, the deflection member 53 is a partially transmissive reflective combiner. Therefore, since external light is also incident to an eye via the deflection member 53 (the combiner), it is possible for a user to recognize an image in which an image that is formed by the display apparatus 50 and external light (scenery) are superimposed. That is, the display apparatus 50 is configured as a see-through type retina scanning type of projection type display apparatus.

In the display apparatus 50 that is configured in this manner, in the present embodiment, the optical device 1 that was described with reference to FIGS. 1A to 5C is disposed in the optical paths that reach the deflection member 53 from the light source section 51. Accordingly, as long as the eye E is positioned within a range in which a luminous flux diameter is enlarged by the optical device 1, it is possible to make images recognizable to a user even if the position of the eye is shifted. In addition, the optical device 1 that is described with reference to FIGS. 1A to 5C, even after a luminous flux has been enlarged in two directions, the luminous flux has a stable large light intensity regardless of an incidence angle and unevenness in optical intensity distribution is small. For this reason, since it is possible to set a scanning angle of the scanning unit 52 to be wide, it is possible to provide a user with an image with a large image angle.

Additionally, the optical device 1 may be disposed in any position between the light source section 51 and the scanning unit 52, between the scanning unit 52 and the relay lens 541, between the relay lenses 541 and 542, or between the relay lens 542 and the projection lens system 55, but is disposed relay lens 542 and the projection lens system 55 in the present embodiment.

In a case in which this kind of display apparatus 50 is configured as a see-through type of head mounted display (an eyeglass display), as shown in FIG. 6B, the display apparatus 50 is formed in a glasses type shape. In addition, in a case of respectively causing modulated light to be incident to left and right eyes E of an observer, the display apparatus 50 includes a left eye deflection member 53 and a frame 60 that supports the left eye deflection member 53 with a front portion 61, and an optical unit 56 that includes an optical component that was described with reference to FIG. 6A is provided at each of a left and right temple 62 of the frame 60. In this instance, in addition to the light source section 51, the scanning unit 52, the relay lens system 54 and the projection lens system 55 all being provided in the optical unit 56, only the relay lens system 54 and the projection lens system 55 may be provided in the optical unit 56 and the optical unit 56 and the light source section 51 may be connected by an optical cable or the like.

Another Display Apparatus

In the abovementioned embodiment, light after modulation that is emitted from the light source section 51 is used in scanning by the scanning unit 52. However, a configuration in which a liquid crystal panel is irradiated with light while performing scanning using light prior to modulation that is emitted from the light source section 51 using the scanning unit 52, and modulated light that is emitted from the liquid crystal panel is reflected by the deflection member 53, may be adopted.

In addition, in the abovementioned embodiments, a display apparatus 50 that is provided with the relay lens system 54 is illustrated as an example, but the invention may be applied to a display apparatus 50 that is not provided with a relay lens system 54.

In addition, in the abovementioned embodiments, an optical device 1 to which the invention was applied, was used in a retina scanning type of projection type display apparatus, but the optical device 1 may be used in a projection type display apparatus that makes a virtual image recognizable to a user, or in optical equipment other than a display apparatus.

Other Configuration Examples of Optical Element

In the abovementioned embodiments, the invention was applied to a luminous flux diameter enlargement element, but the invention may be applied to an optical resonance element (an optical resonator) or the like for a laser that creates standing waves.

The entire disclosure of Japanese Patent Application No. 2014-224975, filed Nov. 5, 2014 is expressly incorporated by reference herein.

What is claimed is:

1. An optical element comprising:
   a first substrate that is light-transmissive, the first substrate having a first reflective layer that is formed on a first surface of the first substrate;
   a second substrate that is light-transmissive, the second substrate having a first partially reflective layer that is formed on a first surface of the second substrate, and the second substrate being formed so as to have the same thickness as the first substrate;
   a third substrate having a second reflective layer that is formed on a first surface of the third substrate; and
   a fourth substrate that is light-transmissive, the fourth substrate having a second partially reflective layer that is formed on a first surface of the fourth substrate, and the fourth substrate being formed so as to have the same thickness as the first substrate,
   wherein
     the second substrate is disposed between the first substrate and the third substrate,
     the fourth substrate is disposed between the second substrate and the third substrate,
     the first substrate, the second substrate, and the third substrate are laminated so that the respective first surfaces thereof are parallel and face in the same direction in a lamination direction in which the first substrate, the second substrate, and the third substrate are laminated, and
     reflection properties of the first partially reflective layer are the same as reflection properties of the second partially reflective layer.

2. The optical element according to claim 1,
   wherein the first substrate, the second substrate, and the third substrate are mutually adhered to one another using adhesive layers, which are formed so that the respective thicknesses of the adhesive layers are equivalent.

3. An optical device comprising a plurality of the optical elements according to claim 2,
wherein the respective plurality of optical elements are disposed so that lamination directions of the plurality of optical elements intersect one another.

4. The optical element according to claim 1,
wherein the first partially reflective layer is a dielectric multilayered film.

5. An optical device comprising a plurality of the optical elements according to claim 4,
wherein the respective plurality of optical elements are disposed so that lamination directions of the plurality of optical elements intersect one another.

6. The optical element according to claim 1, further comprising:
an incidence surface on a first side in a direction that intersects the lamination direction; and
an emission surface on a second side in the direction that intersects the lamination direction,
wherein a luminous flux diameter of light that is incident from the incidence surface is enlarged and emitted from the emission surface.

7. An optical device comprising a plurality of the optical elements according to claim 6,
wherein the respective plurality of optical elements are disposed so that lamination directions of the plurality of optical elements intersect one another.

8. An optical device comprising a plurality of the optical elements according to claim 1,
wherein the respective plurality of optical elements are disposed so that lamination directions of the plurality of optical elements intersect one another.

9. The optical element according to claim 1,
wherein a distance between the first reflective layer and the first partially reflective layer is equal to a distance between the first partially reflective layer and the second reflective layer.

10. A manufacturing method of the optical element, the method comprising:
preparing a first substrate that is light-transmissive, the first substrate having a first reflective layer that is formed on a first surface of the first substrate;
preparing a second substrate that is light-transmissive, the second substrate having a first partially reflective layer that is formed on a first surface of the second substrate, and the second substrate being formed so as to have the same thickness as the first substrate;
preparing a third substrate having a second reflective layer that is formed on a first surface of the third substrate; and
preparing a fourth substrate that is light-transmissive, the fourth substrate having a second partially reflective layer that is formed on a first surface of the fourth substrate, and the fourth substrate being formed so as to have the same thickness as the first substrate;
disposing the second substrate between the first substrate and the third substrate;
disposing the fourth substrate between the second substrate and the third substrate; and
laminating the first substrate, the second substrate, and the third substrate so that the respective first surfaces thereof are parallel and face in the same direction in a lamination direction in which the first substrate, the second substrate, and the third substrate are laminated,
wherein reflection properties of the first partially reflective layer are the same as reflection properties of the second partially reflective layer.

11. A display apparatus comprising:
a light source section that emits a luminous flux;
a scanning unit that performs scanning using the luminous flux that is emitted from the light source section and sets the luminous flux as an image;
a deflection member that deflects light that is used in scanning by the scanning unit and causes the light to be incident to an eye of a user; and
an optical device that enlarges a diameter of a luminous flux that is disposed in an optical path that reaches the deflection member from the light source section,
wherein the optical device includes
a first substrate that is light-transmissive, the first substrate having a first reflective layer that is formed on a first surface of the first substrate,
a second substrate that is light-transmissive, the second substrate having a first partially reflective layer that is formed on a first surface of the second substrate, and the second substrate being formed so as to have the same thickness as the first substrate,
a third substrate having a second reflective layer that is formed on a first surface of the third substrate; and
a fourth substrate that is light-transmissive, the fourth substrate having a second partially reflective layer that is formed on a first surface of the fourth substrate, and the fourth substrate being formed so as to have the same thickness as the first substrate,
wherein
the second substrate is disposed between the first substrate and the third substrate,
the fourth substrate is disposed between the second substrate and the third substrate,
the first substrate, the second substrate, and the third substrate are laminated so that the respective first surfaces thereof are parallel and face in the same direction in a lamination direction in which the first substrate, the second substrate, and the third substrate are laminated, and
reflection properties of the first partially reflective layer are the same as reflection properties of the second partially reflective layer.

12. The display apparatus according to claim 11,
wherein the optical device is disposed in the optical path that reaches the deflection member from the scanning unit.

13. The display apparatus according to claim 11,
wherein the deflection member is provided with a reflective surface with a concave curved surface.

14. The display apparatus according to claim 11,
wherein the deflection member is a partially transmissive reflective combiner.

15. The display apparatus according to claim 11,
wherein the deflection member is a hologram that deflects incident light using diffraction.

* * * * *